United States Patent
Chen (10) Patent No.: US 8,411,680 B2
(45) Date of Patent: Apr. 2, 2013

(54) IP MULTICASTING SYSTEM AND A METHOD BASED ON THE MOBILE NETWORK

(75) Inventor: Jian Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1229 days.

(21) Appl. No.: 12/042,421

(22) Filed: Mar. 5, 2008

(65) Prior Publication Data

US 2008/0151911 A1 Jun. 26, 2008

Related U.S. Application Data

(63) Continuation of application No. PCT/CN2006/002272, filed on Sep. 4, 2006.

(30) Foreign Application Priority Data

Sep. 5, 2005 (CN) .......................... 2005 1 0098751

(51) Int. Cl.
*H04L 12/56* (2006.01)

(52) U.S. Cl. ........................................ 370/390; 370/400

(58) Field of Classification Search .................. 370/351, 370/389, 390, 395.1, 398, 399, 431, 432, 370/400

See application file for complete search history.

(56) References Cited

U.S. PATENT DOCUMENTS

| 6,418,138 | B1 | 7/2002 | Cerf et al. | |
|---|---|---|---|---|
| 6,781,999 | B2 * | 8/2004 | Eyuboglu et al. | 370/399 |
| 6,901,058 | B2 * | 5/2005 | Lalwaney | 370/320 |
| 7,035,657 | B2 * | 4/2006 | Chen et al. | 455/518 |
| 7,075,904 | B1 | 7/2006 | Manish et al. | |
| 7,107,066 | B2 * | 9/2006 | Toth et al. | 455/458 |
| 7,161,958 | B2 | 1/2007 | Aramaki | |
| 7,313,107 | B1 | 12/2007 | Mangal | |
| 7,447,156 | B2 * | 11/2008 | Rajahalme | 370/238 |
| 7,522,598 | B2 * | 4/2009 | Wong et al. | 370/390 |
| 7,590,749 | B2 * | 9/2009 | Lu et al. | 709/230 |
| 7,606,186 | B2 * | 10/2009 | Hundscheidt et al. | 370/312 |
| 2002/0114351 | A1 | 8/2002 | Aramaki | |
| 2002/0120769 | A1 | 8/2002 | Ammitzboell | |
| 2003/0007499 | A1 * | 1/2003 | Rajahalme | 370/432 |
| 2003/0073453 | A1 * | 4/2003 | Basilier | 455/503 |

(Continued)

FOREIGN PATENT DOCUMENTS

| CN | 1383653 A | 12/2002 |
|---|---|---|
| CN | 1551582 A | 12/2004 |

(Continued)

OTHER PUBLICATIONS

Japanese Office Action, Japanese Patent Application No. Tokugan 2008-529451, Date of mailing: Oct. 12, 2010, 9 pages.

(Continued)

*Primary Examiner* — Chi Pham
*Assistant Examiner* — Robert Lopata
(74) *Attorney, Agent, or Firm* — Slater & Matsil, L.L.P.

(57) ABSTRACT

An IP multicast system includes: an IGMP proxy unit set in an access network which provides information of a multicast group to which a terminal belongs. The IGMP proxy unit receives data sent from a multicast data source, and sends the data to a base station which then sends the data to the terminal. The IGMP proxy unit simplifies IP multicasting in the mobile network and makes the transfer of multicast data transparent with respect to the core network of the mobile network. This system can support mobile communication networks as WCDMA, CDMA2000, GSM and TD-SCDMA.

20 Claims, 10 Drawing Sheets

U.S. PATENT DOCUMENTS

| | | | | |
|---|---|---|---|---|
| 2003/0187926 A1* | 10/2003 | Karjanlahti | | 709/204 |
| 2004/0037237 A1 | 2/2004 | Lalwaney | | |
| 2005/0118946 A1 | 6/2005 | Colban et al. | | |
| 2006/0002391 A1* | 1/2006 | Takihiro et al. | | 370/390 |
| 2006/0050643 A1* | 3/2006 | Yoshimoto et al. | | 370/241 |
| 2008/0232292 A1* | 9/2008 | Zhang | | 370/312 |
| 2010/0309914 A1* | 12/2010 | Bai et al. | | 370/390 |

FOREIGN PATENT DOCUMENTS

| | | |
|---|---|---|
| CN | 1579051 | 2/2005 |
| CN | 1595887 A | 3/2005 |
| EP | 951198 A2 * | 10/1999 |
| JP | 2002-126081 A | 5/2002 |
| JP | 2003-526267 T | 9/2003 |
| JP | 2004-236037 A | 8/2004 |
| JP | 2005-512362 T | 4/2005 |
| JP | 2005-176155 A | 6/2005 |
| WO | 2005048618 | 5/2005 |

OTHER PUBLICATIONS

European Office Action, European Patent Application No. 06 775 589.2-2416, Dated: Oct. 20, 2010, 4 pages.

Jun et al.: "IGMP Proxy for Multicast Services in Wireless Mobile Networks" Vehicular Technology Conference, 2005. Electronics and Telecommunications Research Institute. pp. 2855-2858.

Cisco Systems et al.: "IGMP Proxy Behavior; draft-ietf-behave-multicast-00.txt" IETF Standard-Working-Draft, Internet Engineering Task Force, IETF, CH, vol. Behave; May 13, 2005. pp. 1-9.

Fenner et al.: "IGMP/MLD-based Multicast Forwarding (IGMP/MLD Proxying)"; Draft-ietf-magma-igmp-proxy-06.txt. Standard-working-draft, Internet Engineering Task Force, IETF, CH, vol. Magma No. 6; Apr. 1, 2004; XP015022468.

Written Opinion of the International Searching Authority, International Application No. PCT/CN2006/002272, Applicant: Huawei Technologies Co., Ltd., et al., Date of completion: Dec. 4, 2006, 10 pages.

International Preliminary Report on Patentability, International Application No. PCT/CN2006/002272, Applicant: Huawei Technologies Co., Ltd., Date of issuance: Mar. 11, 2008, 12 pages.

European Office Action, European Application No. 06 775 589.2-2416, Applicant: Huawei Technologies Co., Ltd., Dated: Aug. 3, 2009, 4 pages.

Chinese Office Action, Chinese Application No. 200680011792.6, Dated: Apr. 29, 2010, 7 pages.

* cited by examiner

IP MULTICASTING SYSTEM AND A METHOD BASED ON THE MOBILE NETWORK

CROSS REFERENCE TO RELATED APPLICATIONS

This application is a Continuation of PCT/CN2006/002272 filed Sep. 4, 2006, and claims the benefit of Chinese Patent Application No. 200510098751.2 filed on Sep. 5, 2005, both of which are incorporated by reference in their entireties herein. The PCT application published in Chinese as WO2007/028325 A1.

FIELD OF THE INVENTION

The present invention relates in general to communications technologies, and more particularly to an IP multicast system and method based on a mobile network.

BACKGROUND OF THE INVENTION

Along with increasingly high integrity of mobile terminals, taking cell phones as an example, cell phones have powerful capabilities of handling information and may provide color screens and video cameras with proper resolutions and colors. A new Radio Access Network (RAN) technology may provide a bandwidth high enough for wireless data transmission. Subsequently, cell phones begin to provide various applications, such as multimedia short message service, Packet Switch (PS) domain video stream service, videophone service, and Multimedia Broadcast Multicast Service (MBMS).

Figure 1:
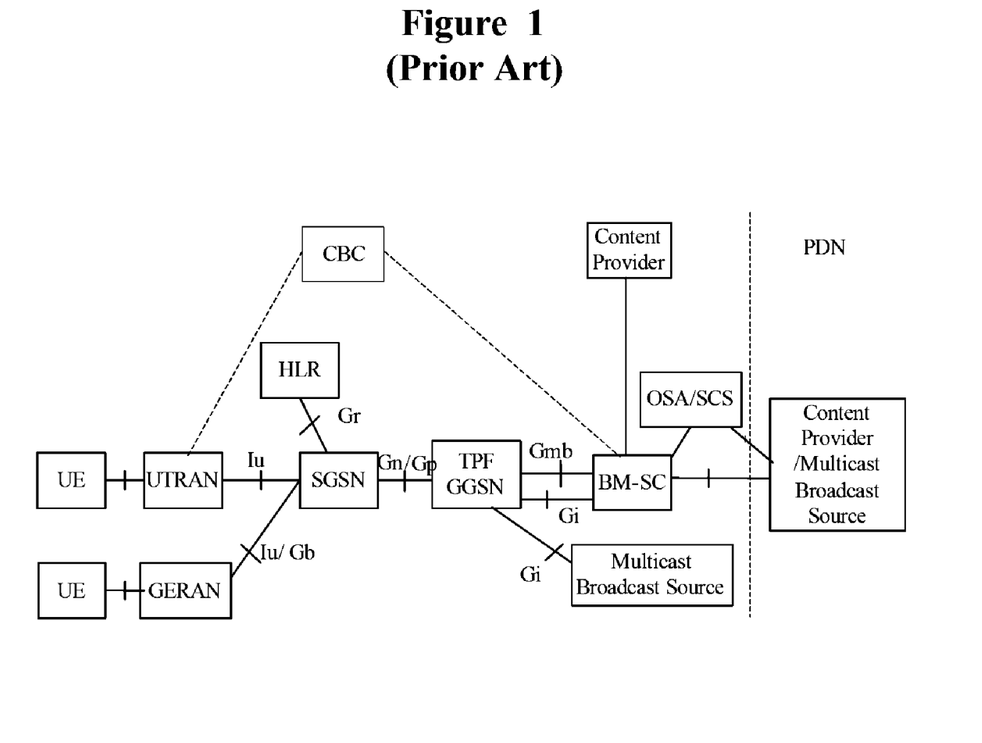
FIG. 1 is a schematic drawing illustrating a conventional network structure for providing a point to point service.

Among the services mentioned above, the first three services need a radio network to provide a bearer for point to point transmission, and the Multimedia Broadcast Multicast Service needs a radio network to provide a bearer for point to multipoint transmission. Transferring point to multipoint services over a network was not considered when the R99 and R4 protocols of the 3rd Generation Partnership Project (3GPP) of the Universal Mobile Telecommunication System (UMTS) network were established. MBMS has been involved in the R6 version protocol, and correspondingly, more functions of core network and access network have been added in the R6 protocol to provide a bearer for point to multipoint transmission. A new node Broadcast Multicast-Service Center (BM-SC) is added outside the core network and coupled with a Gateway GPRS Support Node (GGSN). The BM-SC provides Multimedia Broadcast Multicast Services, and implements the access control and charging of mobile terminals in a multicast service. New functions are supplemented to the user planes and control planes of GGSN, Serving GPRS Support Node (SGSN), Radio Access Network (RAN), and cell phones to assist the BM-SC in providing point to multipoint services. FIG. 1 is a simplified conventional schematic diagram illustrating a relevant network structure in the WCDMA network.

A TV function of cell phone enables users to directly watch TV programs on cell phones so that the users may watch TV programs at any place and at any moment. An investigation shows that the TV function of cell phone holds great attraction to the users. The TV function is one of Multimedia Broadcast Multicast Services, and it could be directly provided in an R6 product in which a Multimedia Broadcast Multicast Service is implemented. However, the establishment of the R6 protocol has not yet been completed, and it will take some time to push well-developed products into markets.

Now, products in WCDMA R99 and R4 protocols are available. The products may provide users with live broadcast services or on-demand broadcast services in a point to point stream media mode, which may result in a high cost of the services, a limited number of users of cell phone TV, a high service fee, and a low commercial value.

In the WCDMA R5 protocol, High Speed Downlink Packet Access (HSDPA) is introduced into a RAN side, which increases capability to handle data on the RAN side. A 3-sector NodeB is capable of handling traffic of data of tens of megabits. There are a lot of applications based on multicast, for example, Internet protocol television (IPTV), video live broadcast, and network radio in the conventional network, and more applications based on the stream media are provided for users. A RAN will function as a high-powered data router plus its conventional functions. At present, however, the RAN cannot support the multicast handling of IP data with respect to live broadcast services.

Figure 2:
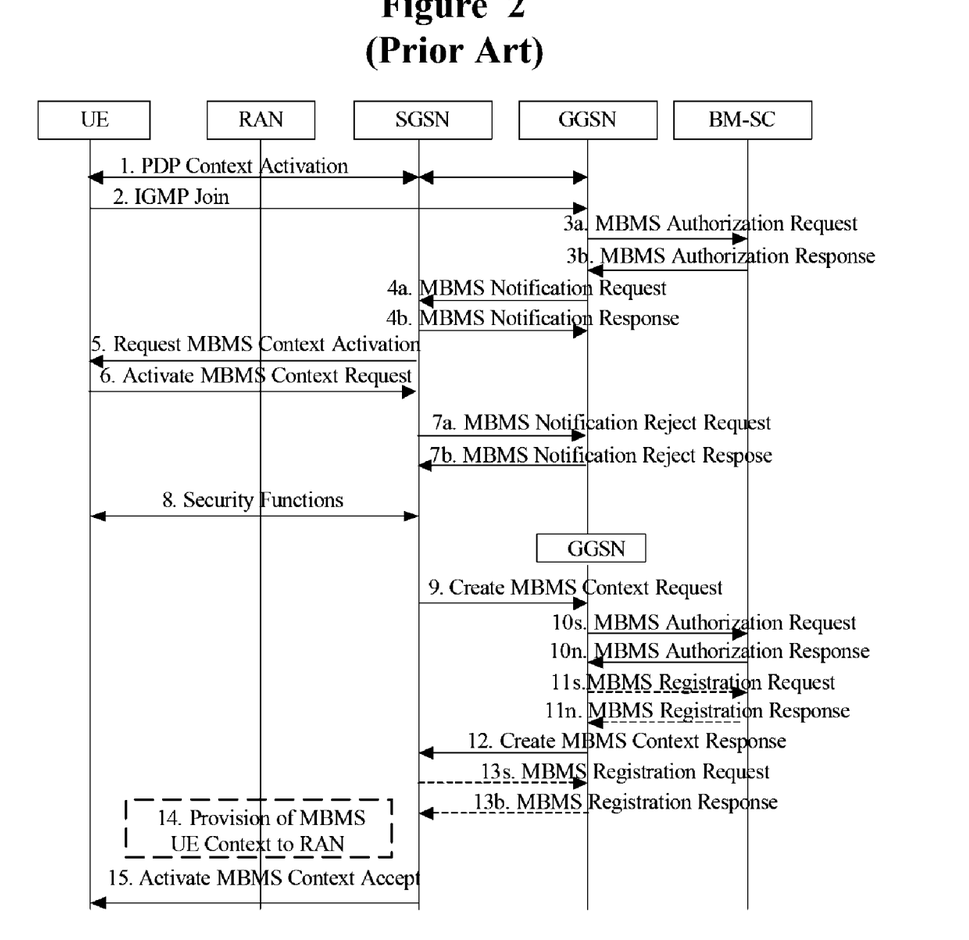
FIG. 2 illustrates the process for initiating an MBMS service in the prior art.

Current mainstream communication mobile networks such as WCDMA, CDMA2000, GSM, or TD-SCDMA are not sufficient to support an IP multicast function. There is a relevant MBMS protocol in the R6 protocol of WCDMA, but it is rather complex and difficult to implement an MBMS protocol with hierarchy from a higher layer to a lower layer. FIG. 2 illustrates a simplified process of implementing an MBMS service in R6 protocol of WCDMA.

As shown in FIG. 2, an Internet Group Management Protocol (IGMP) join request from a User Equipment (UE) is sent to a Gateway GPRS Support Node (GGSN). The entire MBMS service procedure is initiated by the GGSN, and the entire modification involves a plurality of network elements. Along with the constant development of IP networks, there will be a large number of IP multicast data sources (e.g. IPTV) on the Internet. It will be difficult for the UE to transparently access these IP multicast data sources through an R6 MBMS.

In a network supporting current WCDMA R99 and future R4 and R5 protocols, a stream media service is transmitted on the RAN side in a point to point mode. Unfortunately, the resources for transmission between a NodeB and a Radio Network Controller (RNC) are rather limited. Because there is a wide range of the distribution of NodeBs, not all NodeBs have a condition for the laying of optical fiber or a plurality of E1s, and the cost of the laying is quite high. Moreover, for operators without resources for transmission, the price for renting the resources for transmission is also quite high. In the case of a stream media live broadcast service, one operator usually provides only a few of live broadcast channels (for example a few sets of TV programs) due to limited program channels. If, meanwhile, dozens of users under a NodeB are watching the program of the same TV channel, it is necessary to establish for each user a transfer channel for carrying the stream media service data, thus a large number of IUB interface resources are occupied. For this reason, the operators have to increase resources for transmission so as to deal with the insufficiency of IUB interface bandwidth.

A better way that saves bandwidth is to implement an IP multicast function. The IP multicast function provides that, when a plurality of UEs access the same live broadcast program, it is preferable to send only one copy of data at each interface of a mobile network. At present, there is no IP multicast technique implemented for a WCDMA network according to protocols R99, R4 and R5. It is necessary to establish a dedicated channel at each interface of WCDMA system for each user so that users may enjoy a stream media live broadcast service. The same data is sent many times, resources are used ineffectively, and the number of users is limited.

For a stream media live broadcast service, because a dedicated channel is adopted for an air interface, and there are only a couple of limited users that may be served by each cell, the charging of the stream media live broadcast service run by the operator is very high, and the stream media live broadcast service may not be popularized.

SUMMARY OF THE INVENTION

Embodiments of the present invention provide a RAN Proxy technique in a mobile network to enable a RAN to support an IP multicast function, and to enable a terminal to conveniently access various services based on IP multicast.

The present invention concerns an Internet Protocol (IP) multicast system based on a mobile network, in which a terminal accesses a radio network via a base station in an radio access network and the base station is connected to a core network via a radio network base station controller. The IP multicast system based on the mobile network further includes:

an Internet Group Management Protocol (IGMP) proxy unit set in the radio access network, capable of configuring information of a multicast group to which the terminal belongs, receiving data sent from a multicast data source, and sending the data to the base station which then distributes the data to the terminal.

The IGMP proxy unit includes:

a High Process Unit (HPU) IGMP proxy unit, configured to receive the data sent from the multicast data source and distribute the data; and a Low Process Unit (LPU) IGMP proxy unit, configured to send the data distributed by the HPU IGMP proxy unit to the terminal in response to a request from the terminal.

The radio network base station controller includes:

a Signaling And Controlling Unit (SACU), configured to control the HPU IGMP proxy unit and the LPU IGMP proxy unit, and the communication among the HPU IGMP proxy unit, the LPU IGMP proxy unit and the SACU is implemented through a Mobile Group Management Protocol (MGMP).

The IGMP proxy unit is set in the radio network base station controller or the base station.

The IGMP proxy unit is configured to receive the data sent from the multicast data source via an IP router.

The IGMP proxy unit is configured to receive the data via an IU-M interface.

IP data between the IGMP proxy unit and the multicast data source is transferred by a existing physical transmission channel between the radio network base station controller and the core network.

The IGMP proxy unit is configured to receive the data sent from the multicast data source via an IU-PS interface.

The IP data between the IGMP proxy unit and the multicast data source is transferred via a Permanent Virtual Channel (PVC).

The data sent from the multicast data source is multicast data.

The data sent from the multicast data source is unicast data.

The IGMP proxy unit further includes:

a unicast data-multicast data conversion unit, configured to convert the unicast data sent from the multicast data source into multicast data.

The base station further includes:

a multicast data distribution unit, configured to duplicate multicast data and send the duplicated multicast data to the terminal.

The present invention also concerns an Internet Protocol (IP) multicast method based on a mobile network, in which an Internet Group Management Protocol (IGMP) proxy unit is set in a Radio Access Network (RAN), and is configured with the information of a multicast group to which a terminal belongs to, during an IP data multicast. The method includes the steps of:

A. sending, by a multicast data source, data to the IGMP proxy unit;

B. sending, by the IGMP proxy unit, the data to a base station upon receiving the data from the multicast data source; and C. distributing, by the base station, the data to the terminal.

In step A, the data from a multicast data source is sent to the IGMP proxy unit via an IP router.

In step A, the data sent from the multicast data source is multicast data. In step A, the data sent from the multicast data source is unicast data, the method further includes: in step B, converting, by the IGMP proxy unit, a unicast data address of the unicast data into a multicast data address and sends the data to the base station.

In step A, the data from a multicast data source is sent to the IGMP proxy unit in a Transmission Control Protocol/Internet Protocol (TCP/IP) point to point mode.

In step C, the method further includes:

duplicating, by the base station, the data.

The process of duplicating the data is implemented under the control of a radio network base station controller.

The initiation of duplicating the data includes:

sending, by the radio network base station controller, a data distribution initiation message to the base station; and sending, by the base station, a data distribution initiation acknowledgement message to the radio network base station controller.

The termination of the process of duplicating the data includes:

sending, by the radio network base station controller, a data distribution termination message to the base station; and sending, by the base station, a data distribution termination acknowledgement message to the radio network base station controller.

Preferably, the method further includes the steps of:

when the terminal joins the multicast group, sending, by the terminal, an IGMP join request message to the IGMP proxy unit;

sending, by the IGMP proxy unit, a Mobile Group Management Protocol (MGMP) join indication message to Signaling And Control Unit (SACU) in the radio access network;

sending, by the radio network base station controller SACU, an MGMP join acknowledge message to the IGMP proxy unit; and sending, by the IGMP proxy unit, an IGMP join acknowledge message to the terminal.

The IGMP proxy unit includes a Lower Process Unit (LPU) IGMP proxy unit and a High Process Unit (HPU) IGMP proxy unit. When the terminal requests to join the multicast group, the inventive method preferably includes the steps of:

sending, by the terminal, a multicast service request to the LPU IGMP proxy unit;

determining, by the LPU IGMP proxy unit, whether the multicast group exists;

if the multicast group exists, adding the terminal to a multicast data forwarding table in the LPU;

if the multicast group does not exist, sending, by the LPU, an IGMP join request to the HPU, and creating the multicast data forwarding table for the multicast group.

Preferably, the method further includes the steps of:

when the terminal requests to leave the multicast group, if the terminal is determined as the last user of the multicast group, sending, by the LPU, an IGMP leave request to the HPU.

Preferably, the method further includes the steps of:

when the multicast group is released, sending, by the terminal, an IGMP leave request message to the IGMP proxy unit;

sending, by the IGMP proxy unit, an MGMP leave indication message to an SACU in the radio network base station controller;

sending, by the SACU, an MGMP leave acknowledge message to the IGMP proxy unit;

sending, by the IGMP proxy unit, an IGMP leave acknowledge message to the terminal.

In addition, the method preferably includes the steps of:

when the terminal switches cells, sending, by an SACU, an IGMP leave indication message to a source IGMP proxy unit;

sending, by the source IGMP proxy unit, an IGMP leave acknowledge message to the SACU;

sending, by the SACU, an IGMP join request message to a target IGMP proxy unit; and sending, by the target IGMP proxy unit, an IGMP join acknowledge message to the SACU.

The method also preferably includes the steps of:

when the terminal switches across radio access networks or across core networks, sending, by a source SACU, an MGMP join request message to a target SACU;

forwarding, by the target SACU, the MGMP join request message to a target IGMP proxy unit;

sending, the target IGMP proxy unit, an MGMP join acknowledge message to the target SACU;

forwarding, by the target SACU, the MGMP join acknowledge message to the source SACU;

sending, by the source SACU, an MGMP delete request message to the IGMP proxy unit as a source IGMP proxy unit; and sending, by the source IGMP proxy unit, an MGMP delete acknowledge message to the source SACU.

The IGMP proxy unit includes an HPU IGMP proxy unit and an LPU IGMP proxy unit, and the terminal accesses to the HPU via the LPU.

Embodiments of the present invention provide an IGMP proxy unit in an access network, and multicast data is sent to a base station via the IGMP proxy unit, thereby completing the distribution of the multicast data and economizing network bandwidth. Because an IGMP proxy technique is adopted on the access network, relevant handling of IGMP protocols at a high speed on an access network enables the users to obviously experience the connection at a higher speed.

An MGMP protocol is adopted in embodiments of the present invention to enable users to receive multicast data even when being on the move. Well suited for adaptation in a mobile network, this solution simplifies the IP multicast in a mobile network, makes the transfer of multicast data transparent with respect to the core network, thereby making it convenient for users to visit all the multicast data sources in the existing Internet.

With a bypass technique for multicast data used in the embodiments of the present invention, a dedicated channel for transferring multicast data considerably improves the Quality of Service (QOS) of the multicast data.

With the solution provided by the present invention, the cost of business operation is remarkably lowered, and the resources for transmission on the interface from the base station to a radio network base station controller are economized.

BRIEF DESCRIPTION OF THE DRAWINGS

The invention will become more readily apparent from the Detailed Description of the Inventions, which proceeds with reference to the drawings, in which.

EMBODIMENTS OF THE INVENTION

A detailed description is given as follows to embodiments of the present invention with reference to the accompanying drawings.

In accordance with an embodiment of the present invention, a RAN multicast proxy technique is adopted in a mobile network to enable a RAN to support an IP multicast function so as to make it convenient for a terminal to use various services based on IP multicast, and to provide a transparent channel between users and enormous multicast data resources on the Internet so as to provide operators and ordinary users with low cost stream media services based on IP multicast.

Mobile networks in accordance with an embodiment of the present invention include but not limited to such mobile networks as WCDMA, CDMA2000, GSM and TD-SCDMA, and a description is given as follows with WCDMA as a non-limiting example.

Figure 3:
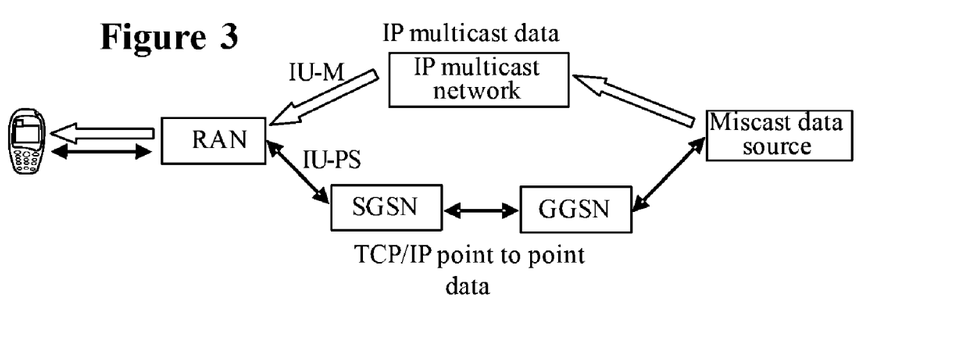
FIG. 3 is a simplified schematic drawing illustrating a structure in a WCDMA network in accordance with an embodiment of the present invention.
Figure 4:
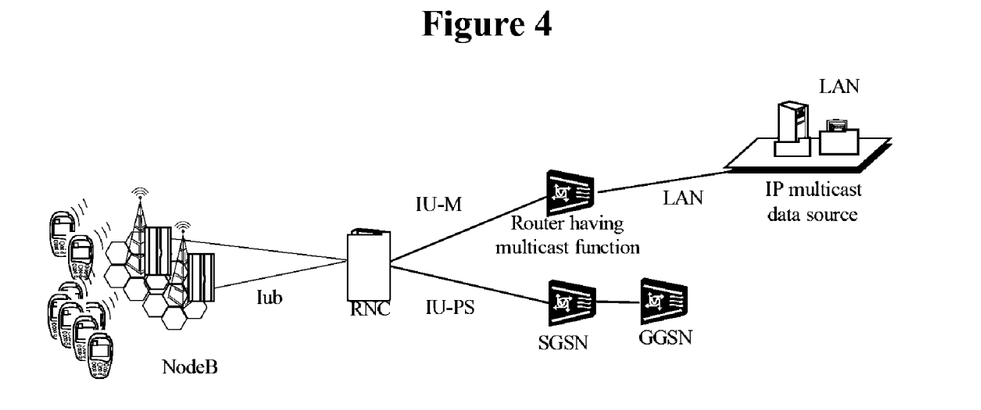
FIG. 4 is a simplified schematic drawing illustrating a structure in a WCDMA network in accordance with another embodiment of the present invention.

FIGS. 3 and 4 schematically illustrate simplified structures in a WCDMA network in accordance with an embodiment of the present invention. A terminal accesses a radio network via a base station in a RAN, and the base station is connected to a core network via a radio network base station controller. The radio network base station controller may be a network element depending on the radio network, for example, a Radio Network Controller (RNC) in WCDMA and TD-SCDMA, and a Base Station Controller (BSC) in GSM, or a CBSC in CDMA2000.

Figure 5:
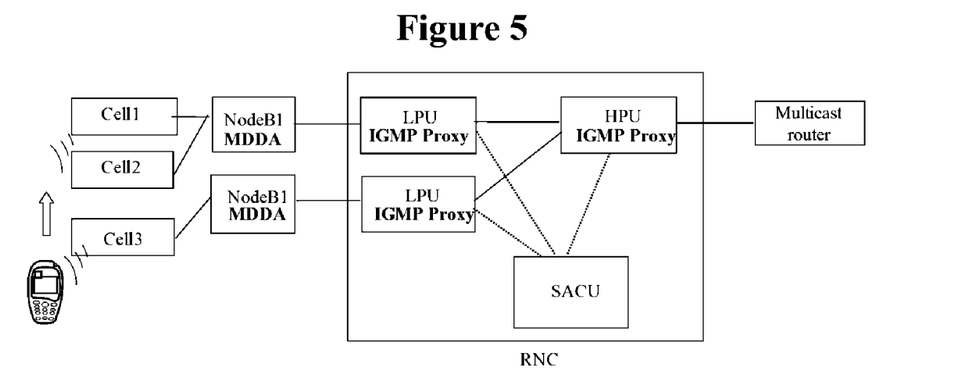
FIG. 5 is a simplified schematic drawing illustrating an IGMP proxy unit and its connection in a network in accordance with another embodiment of the present invention.

FIG. 5 illustrates an Internet Group Management Protocol (IGMP) proxy unit and connection thereof in a system in accordance with an embodiment of the present invention. The IGMP proxy unit set in a RAN provides information of a multicast group to which a terminal user belongs. The IGMP proxy unit is also configured to receive multicast data sent from a multicast data source and send the multicast data to a base station which distributes the multicast data to the terminal user.

In accordance with an embodiment of the present invention, a hierarchical IGMP proxy function is provided in a RAN. A bypass technique is, for IP multicast user plane data, directly used on the RAN side. An IU-Multicast (IU-M) interface dedicated for handling multicast data is added to the RAN side. IP multicast data can be acquired directly from an IP multicast router having a multicast forwarding function. IP multicast data can also be carried via an existing physical transmission channel between the RAN and the CN. For example, a Permanent Virtual Channel (PVC) of IP data, for example, IP over ATM (IPOA), is separately set up to transfer the IP multicast data at an IU-PS interface. IP multicast data is distributed by a user plane, and the lowest layer is configured at the base station (For example at the NodeB in the WCDMA network) for distribution. In this manner, a plurality of cells under a base station can share one multicast data source at the interfaces between the base station and a radio network base station controller (For example the IUB interface in the WCDMA network).

As shown in FIG. 3, user plane data sent to the terminal is divided into two parts, IP multicast data and connection-oriented TCP/IP data. IP multicast data can be forwarded via an IP multicast network as a bypass instead of being forwarded via a CN. The IP multicast data is sent to an IGMP proxy unit in a RAN via multi-level routers having a multicast forwarding function. Other connection-oriented TCP/IP data of a UE is communicated with a multicast data source via an original path. The logical channel transferring multicast data may be independently networked, or share a physical interface with the relevant network element in a mobile network (for example, share an ATM Over SDH with an IU interface in a WCDMA network) on which a PVC transferring multicast data is separately set.

Figure 6:
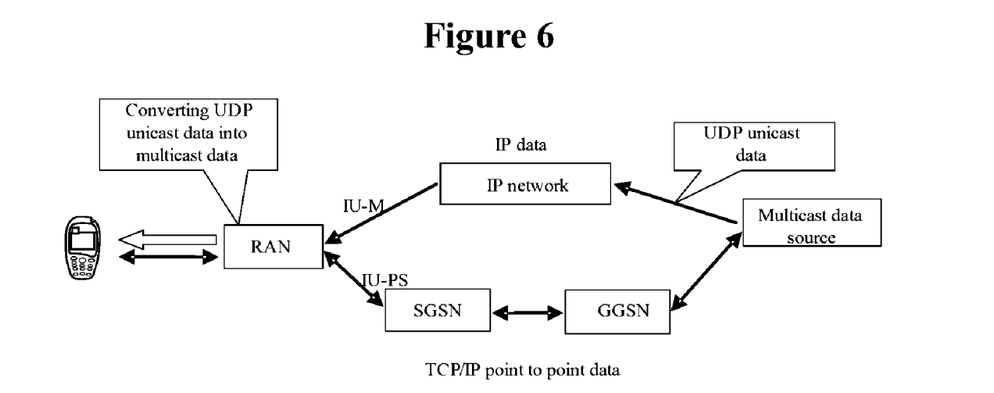
FIG. 6 is a simplified schematic drawing illustrating the process of sending unicast data in accordance with another embodiment of the present invention.
Figure 7:
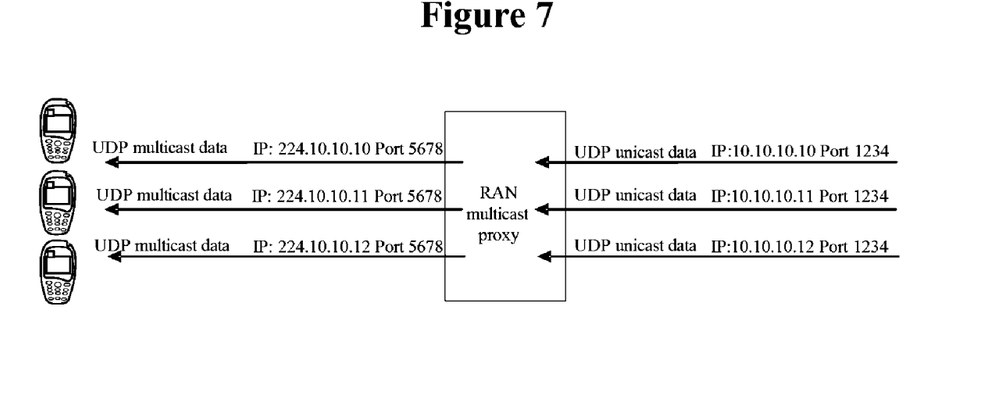
FIG. 7 illustrates the simplified process of forming multicast data from unicast data in accordance with another embodiment of the present invention.

As shown in FIGS. 6 and 7, multicast data being bypassed may be transmitted via a bypass in a multicast mode. Alternatively, User Datagram Protocol (UDP) packets are transferred via an IP network to a RAN in a unicast mode, and a multicast proxy in the RAN converts the UDP packets into multicast data and transfers the multicast data to UEs. In accordance with the embodiment of the present invention, at the beginning of networking, a multicast service can be provided for terminals in the case of an immature IP transmission network supporting multicast transmission and in the case of only a few multicast services over a mobile network.

Unicast data may be converted into multicast data. For example, a unicast IP address may be converted into a specific multicast address by an IGMP proxy unit by network configuration. The IGMP proxy unit may check each data packet sent from an IU-M interface. If the target address of a data packet is the designated IP address to be converted, convert the data packet to the data with a specific IP multicast address according to the network configuration. Converting the unicast data packet into a multicast data packet described above is just an additional function. The data sent from the IU-M interface may be multicast data packets.

In accordance with an embodiment of the present invention, in a mobile network, an IGMP multicast function is handled in a RAN instead of being handled in a CN. The IGMP proxy unit is set in the RAN, and it can be set in a radio network base station controller or at a base station.

The IGMP proxy unit may be provided as multi-level as shown in FIG. 5. A description is given in this solution by taking a two-level IGMP proxy as an example. The two-level unit includes:

a High Process Unit (HPU) IGMP proxy unit for receiving multicast data sent from a multicast data source and distributing the multicast data to a Low Process Unit (LPU) IGMP proxy unit described below; and the LPU IGMP proxy unit for receiving a request from a terminal and sending the multicast data to the terminal.

The principle of an IGMP proxy unit within a RAN is implemented as shown in FIG. 5. In this figure, the entities in bold are newly added in accordance with an embodiment of the present invention, i.e. the IGMP proxy unit is configured at a radio network base station controller. An IGMP message sent from a UE is directly processed within the radio network base station controller. Hierarchical IGMP proxy functions may be performed in the radio network base station controller.

In accordance with an embodiment of present invention, there are two levels in the IGMP proxy unit: a Lower Process Unit (LPU) and a High Process Unit (HPU). The IGMP proxy unit implemented in the LPU may function as a multicast user group under the management of a multicast router, thereby reducing the burden of processing IGMP on the HPU, and implementing the distributed processing of the IGMP proxy unit. When a terminal user requests to join a multicast group, if there is no multicast group in the LPU, the LPU will send an IGMP join request to the HPU, and create a multicast data forwarding table for the multicast group. If the multicast group is in the LPU already, the terminal user is added to the multicast data forwarding table within the LPU, and the LPU does not need to send any IGMP join request to the HPU. When the terminal user requests to leave the multicast group, if the user is the last user in the multicast group, the LPU sends an IGMP leave message to the HPU. If the user is not the last user, the LPU does not need to send the HPU an IGMP leave message. Similarly for the HPU, when the HPU receives the IGMP leave message sent from the LPU, if the terminal user is the last user in the multicast group, the HPU sends an IGMP leave message to a higher layer. If the user is not the last user, the HPU does not need to send any IGMP leave message to a higher layer router.

At the beginning of constructing a network, it is allowed to directly make use of the multicast function based on hardware within the radio network base station controller, as only a few multicast services are provided over the mobile network. For example, if a hardware platform of the radio network base station controller is based on ATM exchanging, multicast and broadcast functions of ATM layer may be used to directly distribute data from an HPU to an LPU, and determine whether to further distribute the data by the LPU according to whether there is a user request. If the hardware platform of the radio network base station controller is based on an IP exchanging, IP multicast exchanging functions may be used to directly distribute the data from HPU to LPU, and then determine whether to further distribute the data by the LPU according to whether there is a user request. A description of the multicast data distribution process is given as follows with the radio network base station controller based on an ATM exchanging platform as an example.

Figure 8:
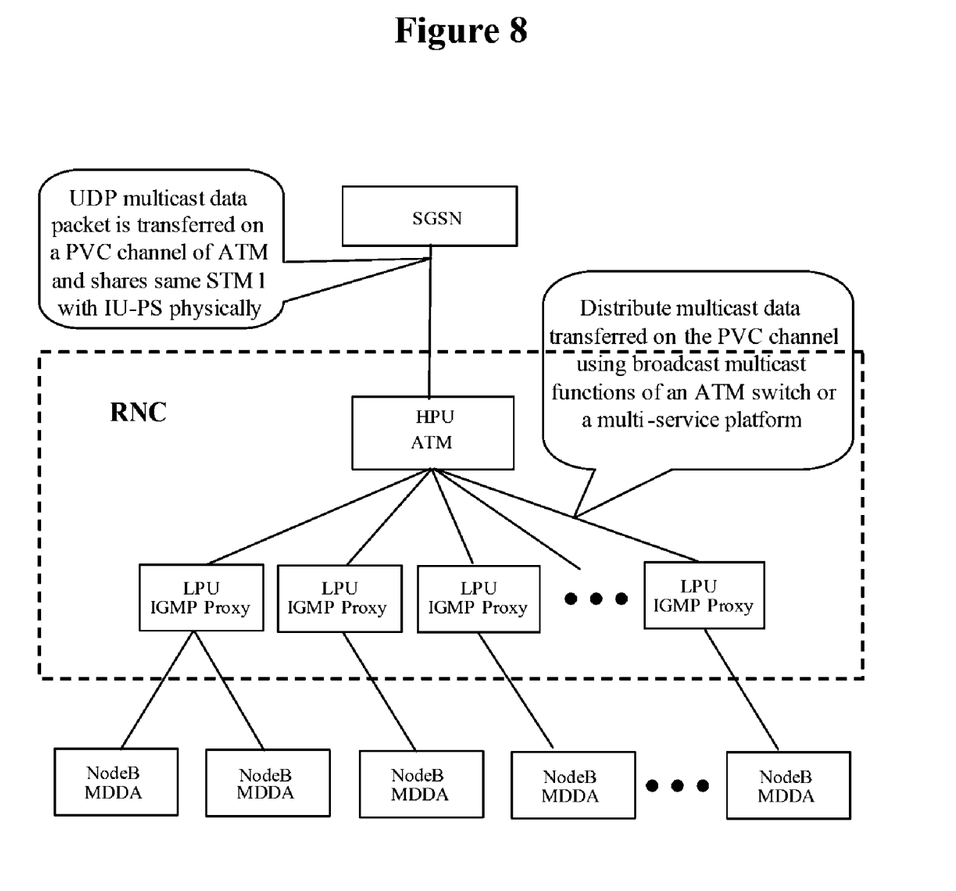
FIG. 8 is a simplified schematic drawing illustrating the process of distributing multicast data by an IGMP proxy unit in accordance with another embodiment of the present invention.

As shown in FIG. 8, an ATM multicast function based on hardware within a radio network base station controller is provided to simplify the distribution processing of multicast data within the radio network base station controller and guarantee a high Quality of Service (QOS).

In accordance with an embodiment of the present invention, because a terminal is mobile, the IGMP proxy unit needs to perform interaction of a protocol with a Signaling and Control Unit (SACU) of the radio network base station controller so as to implement the mobility of the terminal. The protocol may be Mobile Group Management Protocol (MGMP).

As shown in FIG. 8, a Multicast Data Distribute Agent (MDDA) unit set in a base station acts a function of multicast data distribute agent. The MDDA is an optional unit, adapted for economizing the bandwidth of interface between the base station to a radio network base station controller (Iub interface). When a plurality of cells under the base station (NodeB) have the same multicast data to be sent, only one copy needs to be sent through the Iub interface. The MDDA unit is responsible for making a plurality of copies of the multicast data and sending the multicast data over the air interface between the plurality of cells and the terminals which are to receive the multicast data.

Figure 9:
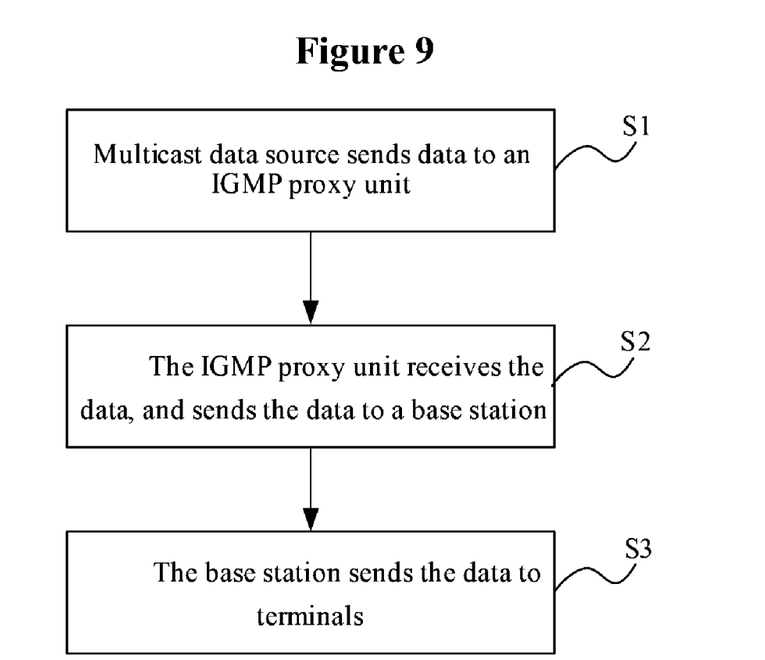
FIG. 9 is a simplified schematic flowchart in accordance with another embodiment of the present invention.

An IP multicast method based on a mobile network in accordance with an embodiment of the present invention is based on an IGMP proxy unit. The IGMP proxy unit is configured in a RAN, and provided thereon with the information of multicast group to which a terminal belongs. When transmitting IP data in a multicast mode, as shown in FIG. 9, the method includes following steps described.

S1. A multicast data source sends data to the IGMP proxy unit.

The multicast data source sends the IGMP proxy unit the data to be multicast to a terminal. The data may be multicast or unicast. If the data are unicast, it is necessary to convert the unicast data into multicast data.

The multicast data source may send data to the IGMP proxy unit in two modes:

A. send the data to the IGMP proxy unit via an IP router; and

B. send the data to the IGMP proxy unit in a TCP/IP point to point mode.

S2. The IGMP proxy unit receives the data and sends the data to a base station.

After the IGMP proxy unit receives the data, if the data is unicast, the IGMP proxy unit converts the unicast data into multicast data, for example, as shown in FIG. 7. The IGMP proxy unit converts a unicast data address into a multicast data address, and then sends the multicast data to the base station. If the data is multicast, the data is directly sent to the base station which then distributes the data to terminals within different cells.

S3. The base station distributes the data to the terminals.

The base station sends multicast data to the terminals within the cells so as to enable the terminals to receive the multicast data and enjoy the corresponding service.

In this step, the method in accordance with the embodiment of the present invention may further include the process that the base station duplicates the data, and the process that the base station terminates duplicating the data. The above process that the base station duplicates the data is under the control of a radio network base station controller.

Figure 10:
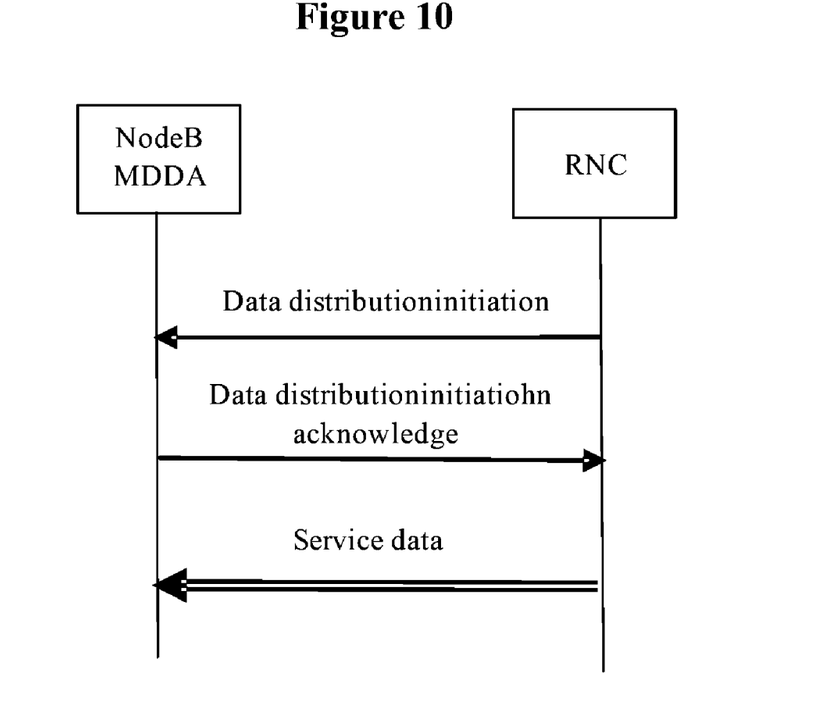
FIG. 10 is a simplified schematic drawing illustrating the process of initiating data distribution in accordance with another embodiment of the present invention.

The initiation of duplicating the data by the base station as an example shown in FIG. 10 includes the following processes.

The radio network base station controller sends a data distribution initiation message to the base station.

The base station sends a data distribution initiation acknowledgement message to the radio network base station controller.

If the data between the base station and the radio network base station controller is transmitted in a direct connection mode, the radio network base station controller directly delivers service data to the base station.

Figure 11:
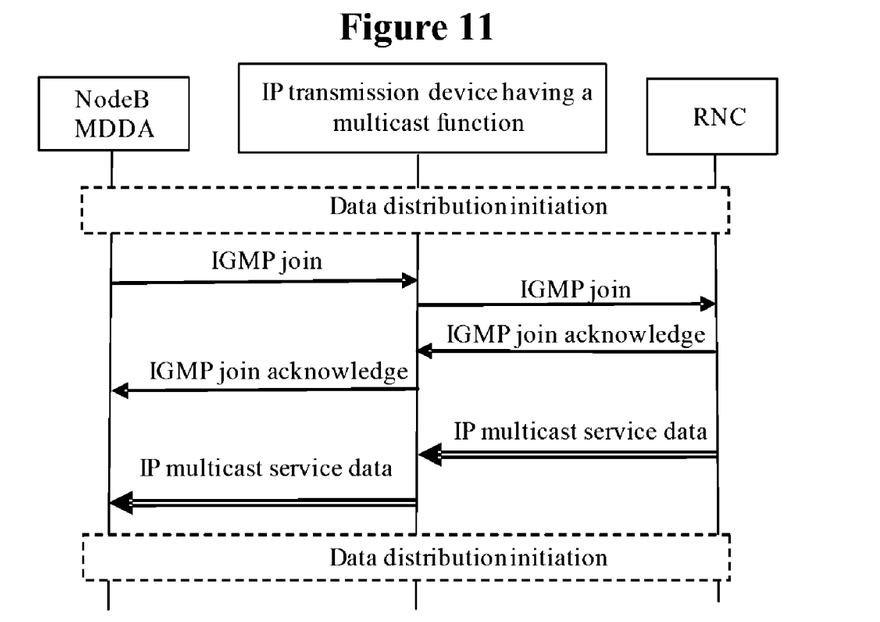
FIG. 11 is a simplified schematic drawing illustrating the detailed process of initiating data distribution in accordance with another embodiment of the present invention.

If the data between the base station and the radio network base station controller is transmitted over an IP network, after the data distribution is initiated by the base station controller, a solution may be adopted as shown in FIG. 11.

NodeB MDDA initiates an IGMP join message to an IP network transmission device. If there is no corresponding multicast data source in the IP network transmission device, the IP network transmission device initiates the IGMP join message to a higher IP network transmission device level-by-level through an IP multicast protocol until the IGMP join message is transferred to the RNC. When receiving the IGMP join message, the RNC delivers the corresponding multicast service data to the IP network transmission device according to the IP multicast protocol. The RNC sends an IGMP join acknowledge message to the IP network transmission device. The IP network transmission device transmits the IGMP join acknowledge message to the base station according to the IP multicast protocol level-by-level. When receiving the IGMP join acknowledge message, the base station sends a data distribution initiation acknowledge message to the RNC via the existing signaling transmission channel.

Figure 12:
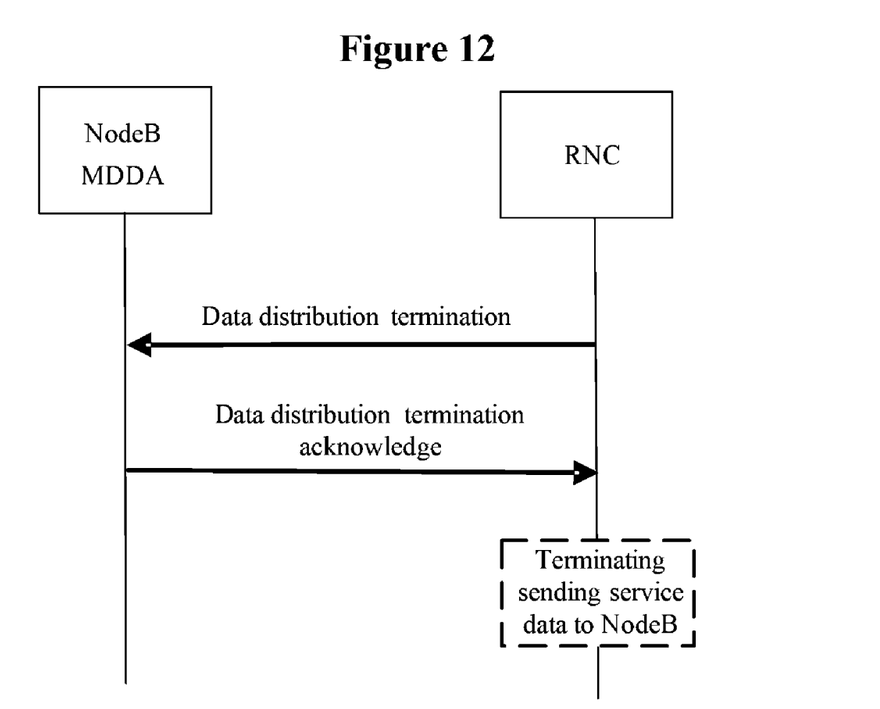
FIG. 12 is a simplified schematic drawing illustrating the process of terminating data distribution in accordance with another embodiment of the present invention.

The termination of duplicating the data by the base station as shown in FIG. 12 includes the following processes.

The radio network base station controller sends the base station a data distribution termination message.

The base station sends the radio network base station controller a data distribution termination acknowledgement message.

If the data between the base station and the radio network base station controller is transmitted in a direct connection mode, the radio network base station controller directly terminates delivering service data to the base station.

Figure 13:
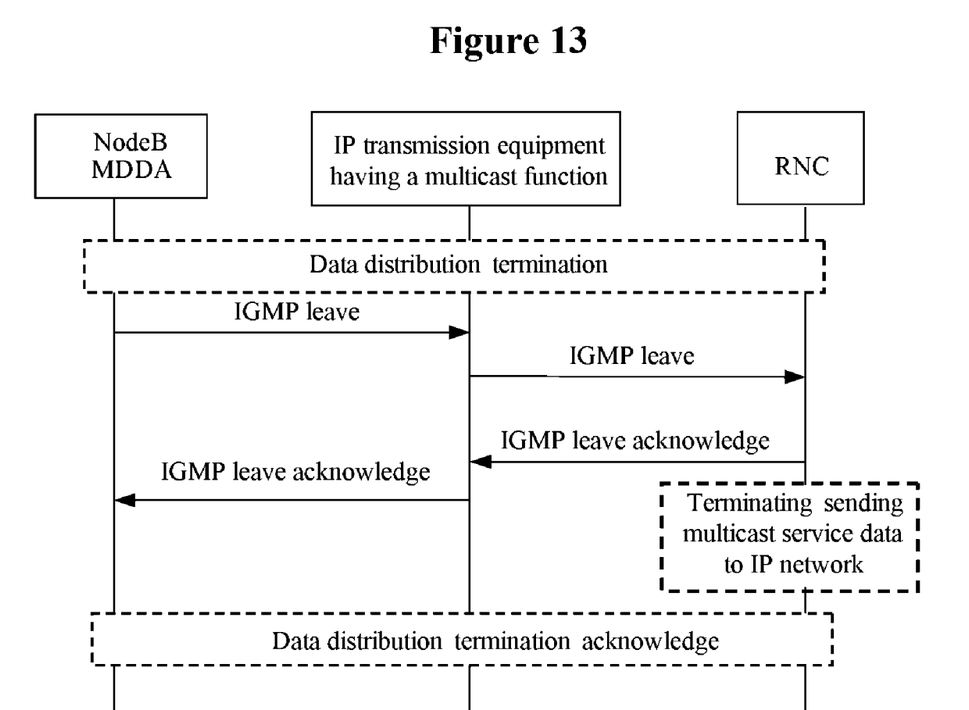
FIG. 13 is a simplified schematic drawing illustrating the detailed process of terminating data distribution in accordance with another embodiment of the present invention.

If the data between the base station and the radio network base station controller is transmitted over an IP network, when the base station receives the data distribution termination message sent from the base station controller, the solution as shown in FIG. 13 can be adopted.

NodeB MDDA initiates an IGMP leave message to the IP network transmission device. If there are no other NodeBs receiving the multicast data source from the IP network transmission device, the IP network transmission device initiates an IGMP join message to an higher IP network transmission device level-by-level until the IGMP leave message is transferred to the RNC. When receiving the IGMP leave message, the RNC terminates sending the multicast service data to the IP network transmission device. The RNC sends an IGMP leave acknowledge message to the IP network transmission device, which is then transmitted by the IP network transmission device to the base station level-by-level. When receiving the IGMP leave acknowledge message, the base station sends a data distribution termination acknowledge message to the RNC via the existing signaling transmission channel.

The IGMP proxy unit may be hierarchically configured, for example, as an LPU and an HPU, and the terminal accesses the HPU via the LPU.

The IP multicast method based on the mobile network includes several intermediate processes as described below in accordance with embodiments of the present invention.

Figure 14:
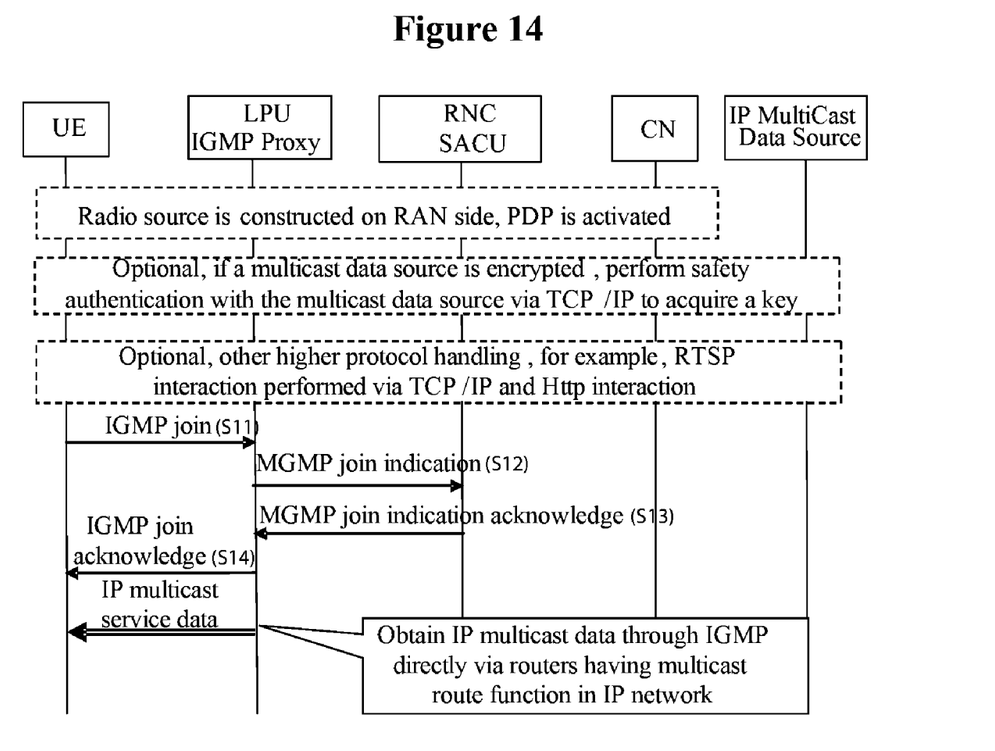
FIG. 14 is a simplified schematic drawing illustrating the process of establishing a multicast in accordance with another embodiment of the present invention.

1. When a multicast is constructed, as shown in FIG. 14, PO
S11. a terminal sends an IGMP join request message to an IGMP proxy unit;
S12. the IGMP proxy unit sends an MGMP join indication message to a Signaling And Control Unit (SACU) in a radio network base station controller;
S13. the SACU sends an MGMP join acknowledge message to the IGMP proxy unit; and
S14. the IGMP proxy unit sends the IGMP join acknowledge message to the terminal.

Figure 15:
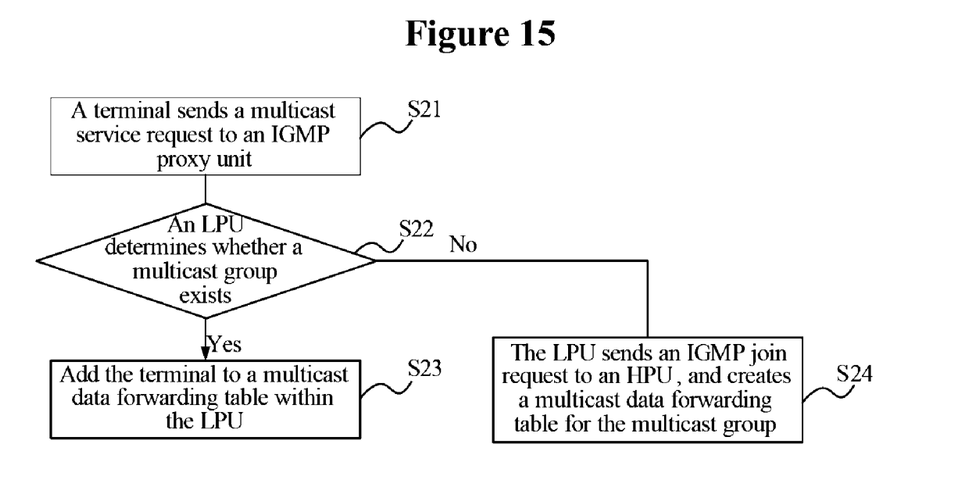
FIG. 15 is a simplified schematic drawing illustrating the process that a terminal requests to join a multicast group in accordance with another embodiment of the present invention.

2. When the terminal requests to join the multicast group, as shown in FIG. 15,
S21. the terminal requests a multicast service from the IGMP proxy unit;
S22. the LPU determines whether the multicast group exists, if the multicast group exists, the LPU adds the terminal to a multicast data forwarding table; if the multicast group does not exist, move to S23;
S23. the LPU sends an IGMP join request to the HPU, and creates the multicast data forwarding table for the multicast group.

Figure 16:
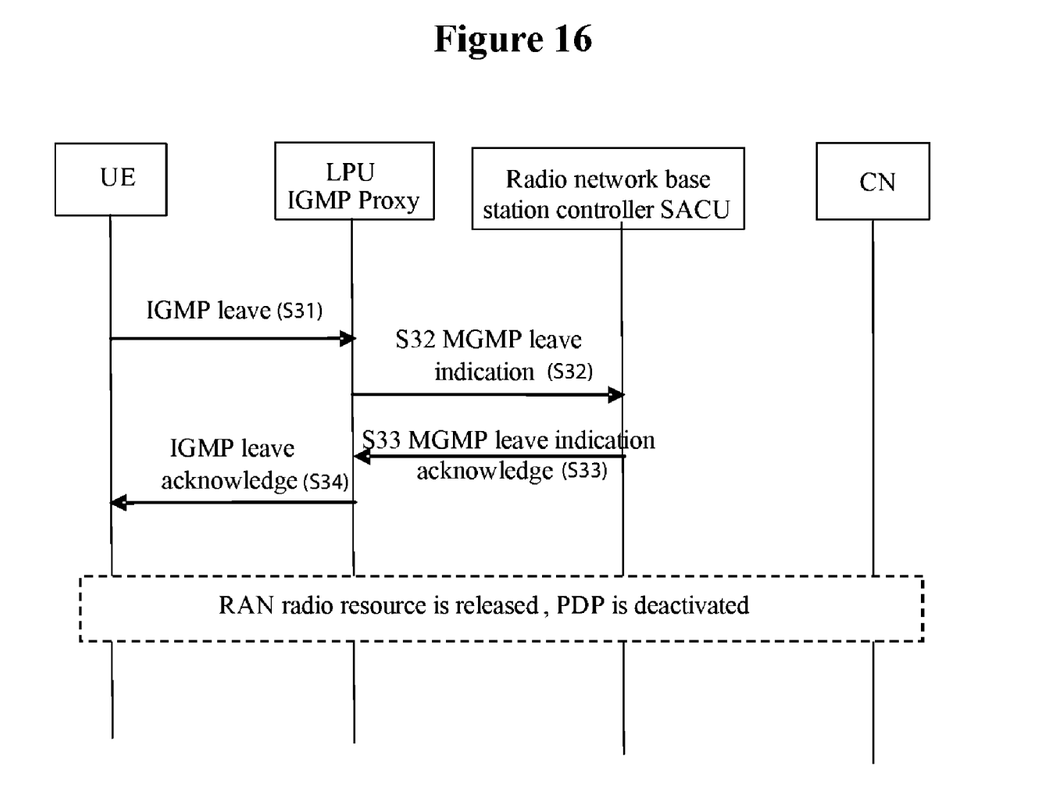
FIG. 16 is a simplified schematic drawing illustrating the process of releasing a multicast in accordance with another embodiment of the present invention.

3. When a multicast is released, as shown in FIG. 16,
S31. the terminal sends an IGMP leave request message to the IGMP proxy unit;
S32. the IGMP proxy unit sends an MGMP leave indication message to the SACU;
S33. the SACU sends an MGMP leave acknowledge message to the IGMP proxy unit; and
S34. the IGMP proxy unit sends an IGMP leave acknowledge message to the terminal.

4. When the terminal request to leave the multicast group,
the LPU determines whether the terminal user is the last user in the multicast group; if the terminal user is the last user, the LPU sends the HPU an IGMP leave request.

Figure 17:
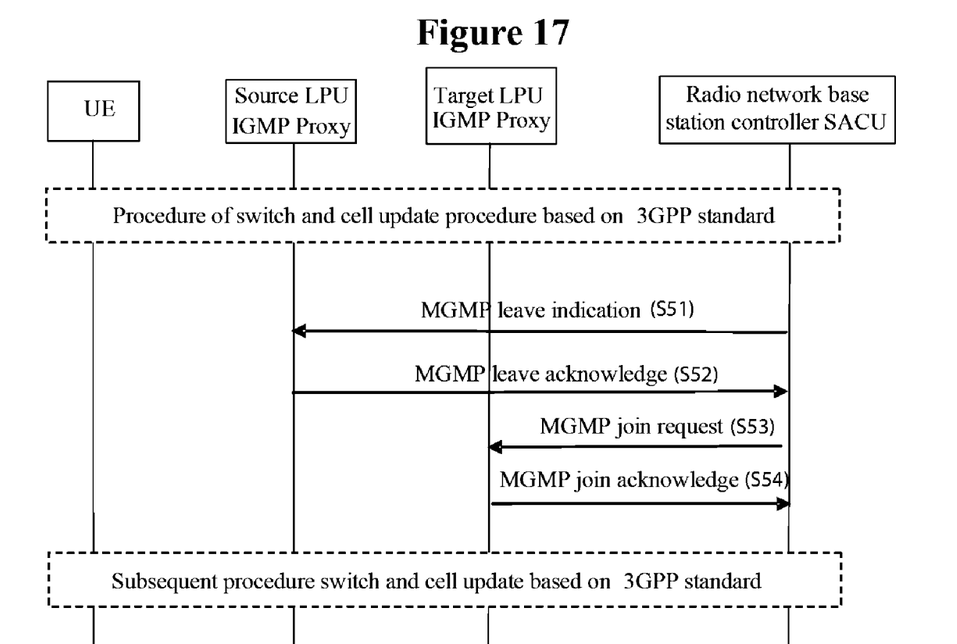
FIG. 17 is a simplified schematic drawing illustrating the process of switching and updating cells in accordance with another embodiment of the present invention.

5. When the terminal switches cells, as shown in FIG. 17,
S51. the SACU sends an IGMP leave indication message to a source IGMP proxy unit;
S52. the source IGMP proxy unit sends an IGMP leave acknowledge message to the SACU;
S53. the SACU sends an IGMP join request message to a target IGMP proxy unit; and S54. the target IGMP proxy sends an IGMP join acknowledge message to the SACU.

Figure 18:
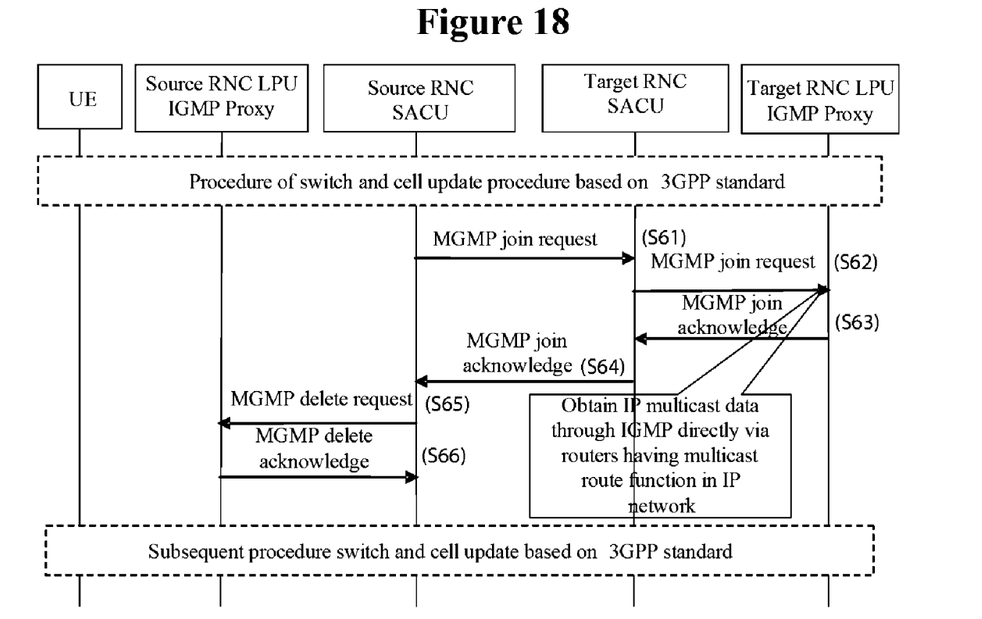
FIG. 18 is a simplified schematic drawing illustrating the process of switching across radio network base station controllers in accordance with another embodiment of the present invention.

6. When the terminal switches across RANs or across CNs, as shown in FIG. 18,
S61. a source SACU sends an MGMP join request message to a target SACU;
S62. the target SACU forwards the MGMP join request message to the target IGMP proxy unit;
S63. the target IGMP proxy unit sends an MGMP join acknowledge message to the target SACU;
S64. the target SACU forwards the MGMP join acknowledge message to the source SACU;
S65. the source SACU sends an MGMP delete request message to the source IGMP proxy unit; and
S66. the source IGMP proxy unit sends an MGMP delete acknowledge message to the source SACU.

In accordance with the embodiments of the present invention, in a mobile network, a RAN multicast proxy technique is adopted to enable a RAN to support an IP multicast function. Meanwhile, a Mobile Group Management Protocol (MGMP) is used to meet the requirement of mobility. Therefore, it is convenient for a terminal to use various services based on IP multicast. A transparent and direct channel between mobile users and the enormous multicast data resources in the existing Internet may be set up to provide operators and ordinary users with low cost stream media services based on IP multicast.

Obviously, those skilled in the art may make numerous modifications and variations to the solution of the present invention without departing from the spirit and scope thereof. Accordingly, it is intended that this invention includes these changes and variations that come within the scope set forth in the appended claims, and all foreseeable equivalents to the claimed elements of the present invention.

What is claimed is:

1. An Internet Protocol (IP) multicast system based on a mobile network, comprising:
    a radio access network, through which a terminal accesses a core network;
    an Internet Group Management Protocol (IGMP) proxy unit set in the radio access network, and adapted to configure information of a multicast group to which the terminal belongs, to receive IP multicast data sent from a multicast data source, and to send the IP multicast data to the terminal according to the information of the multicast group; and
    a dedicated multicast channel between the IGMP proxy unit and the multicast data source, the dedicated multicast channel adapted to transfer the IP multicast data from the multicast data source to the IGMP proxy unit;
    wherein the radio access network is configured to receive TCP/IP point to point data from the multicast data source via the core network;
    wherein the IGMP proxy unit comprises: a High Process Unit (HPU) IGMP proxy unit, configured to receive the data sent from the multicast data source and distribute the data; a Lower Process Unit (LPU) IGMP proxy unit, configured to send the data distributed by the HPU IGMP proxy unit to the terminal in response to a request from the terminal.

2. The system of claim 1, wherein the radio access network comprises a radio network base station controller; and the radio network base station controller comprises:
    a Signaling And Controlling Unit (SACU), configured to control the HPU IGMP proxy unit and the LPU IGMP proxy unit, wherein communication among the HPU IGMP proxy unit, the LPU IGMP proxy unit and the SACU is implemented through a Mobile Group Management Protocol (MGMP).

3. The system of claim 1, wherein the IGMP proxy unit further comprises:
a unicast data—multicast data conversion unit, configured to convert unicast data sent from the multicast data source into multicast data.

4. The system of claim 1, wherein the IGMP proxy unit is set in a radio network base station controller of the radio access network, or at a base station of the radio access network.

5. The system of claim 1, wherein the IGMP proxy unit is configured to receive the IP multicast data via an IU-M interface and the radio access network is configured to receive the TCP/IP point to point data from the core network via an IU-PS interface .

6. The system of claim 1, wherein the IGMP proxy unit is configured to receive the IP multicast data sent from the multicast data source via an IP router or via a Permanent Virtual Channel (PVC) set over an existing physical transmission channel.

7. The system of claim 1, further comprising:
a multicast data distribution unit, configured to duplicate multicast data and send the duplicated multicast data to the terminal, wherein the multicast data distribution unit is set in a base station of the radio access network.

8. An Internet Protocol (IP) multicast method based on a mobile network, the method comprising:
receiving, by an Internet Group Management Protocol (IGMP) proxy unit set in a radio access network, IP multicast data from a multicast data source through a dedicated multicast channel between the IGMP proxy unit and the multicast data source;
receiving, by the radio access network, TCP/IP point to point data from the multicast data source via a core network; and
sending, by the IGMP proxy unit, the IP multicast data to a terminal according to information of a multicast group to which the terminal belongs,
wherein the IGMP proxy unit is configured with the information of the multicast group to which the terminal belongs, wherein the IGMP proxy unit comprises a lower Process Unit (LPU) IGMP proxy unit and a High Process Unit (HPU) IGMP proxy unit; when the terminal requests to join a multicast group, the method further comprising:
receiving, by the LPU IGMP proxy unit, a multicast service request from the terminal;
determining, by the LPU IGMP proxy unit, whether the multicast group exists;
if the multicast group exists, adding the terminal to a multicast data forwarding table; and
if the multicast group does not exist, sending, by the LPU, an IGMP join request to the HPU, and creating the multicast data forwarding table for the multicast group.

9. The method of claim 8, wherein the data from a multicast data source is sent to the IGMP proxy unit via an IP router or via a Permanent Virtual Channel (PVC) set over an existing physical transmission channel.

10. The method of claim 8, wherein the data sent from the multicast data source is unicast data, the method further comprising:
converting, by the IGMP proxy unit, a unicast data address of the unicast data into a multicast data address.

11. The method of claim 10, wherein the IP multicast data sent from the IGMP proxy unit to the terminal is transmitted via a base station in the radio access network and wherein the method further comprises duplicating, by the base station, the IP multicast data.

12. The method of claim 11, further comprising:
sending, by a radio network base station controller, a data distribution initiation message to the base station; and
receiving, by the radio network base station controller, a data distribution initiation acknowledgement message from the base station.

13. The method of claim 12, wherein the data between the base station and the radio network base station controller is transmitted over an IP network, the method further comprising:
receiving, by the radio network base station controller, an IGMP join message to the radio network base station controller from the base station via an IP network transmission device, wherein the IGMP join message is in response to a received data distribution initiation message from the radio network base station controller; and
sending, by the radio network base station controller, an IGMP join acknowledgement message together with the IP multicast data to the base station via the IP network transmission device in response to the IGMP join message.

14. The method of claim 12, further comprising:
sending, by the radio network base station controller, a data distribution termination message to the base station; and
receiving, by the radio network base station controller, a data distribution termination acknowledgement message from the base station.

15. The method of claim 14, wherein the IP multicast data between the base station and the radio network base station controller is transmitted over an IP network, the method further comprising:
receiving, by the radio network base station controller, an IGMP leave message via an IP network transmission device, wherein the IGMP leave message is from the base station in response to the data distribution termination message;
sending, by the radio network base station controller, an IGMP leave acknowledgement message to the base station via the IP network transmission device; and
terminating sending the data, in response to the IGMP leave message.

16. The method of claim 8, further comprising:
when the terminal joins the multicast group,
receiving, by the IGMP proxy unit, an IGMP join request message from the terminal;
sending, by the IGMP proxy unit, a Mobile Group Management Protocol (MGMP) join indication message to a Signaling And Control Unit (SACU) in the radio access network;
receiving, by the IGMP proxy unit, an MGMP join acknowledge message from the SACU; and
sending, by the IGMP proxy unit, an IGMP join acknowledge message to the terminal.

17. The method of claim 16, further comprising:
when the multicast group is released,
receiving, by the IGMP proxy unit, an IGMP leave request message from the terminal;
sending, by the IGMP proxy unit, an MGMP leave indication message to the SACU;
receiving, by the IGMP proxy unit, an MGMP leave acknowledge message from the SACU; and sending, by the IGMP proxy unit, an IGMP leave acknowledge message to the terminal.

18. The method of claim 17, further comprising:
when the terminal requests to leave the multicast group,
if the terminal is determined as the last user of the multicast group, sending, by the LPU, an IGMP leave request to the HPU.

19. The method of claim 8, further comprising:
when the terminal switches cells,
sending, by an SACU in the radio access network, an IGMP leave indication message to a source IGMP proxy unit;
receiving, by the SACU, an IGMP leave acknowledge message from the source IGMP proxy unit;
sending, by the SACU, an IGMP join request message to a target IGMP proxy unit; and
receiving, by the SACU, an IGMP join acknowledge message from the target IGMP proxy unit.

20. The method of claim 8, further comprising:
when the terminal switches across radio access networks or across core networks,
sending, by a source SACU, an MGMP join request message to a target SACU;
forwarding, by the target SACU, the MGMP join request message to a target IGMP proxy unit;
receiving, by the target SACU, an MGMP join acknowledge message from the target IGMP proxy unit;
forwarding, by the target SACU, the MGMP join acknowledge message to the source SACU;
sending, by the source SACU, an MGMP delete request message to the IGMP proxy unit as a source IGMP proxy unit; and
receiving, by the source SACU, an MGMP delete acknowledge message from the source IGMP proxy unit.

* * * * *